Nov. 11, 1941.   O. N. BRYANT   2,262,562
EXTRACTION CONTROL APPARATUS
Filed Oct. 25, 1940

INVENTOR
Ozro N. Bryant.
BY
A. B. Revis
ATTORNEY

Patented Nov. 11, 1941

2,262,562

UNITED STATES PATENT OFFICE 2,262,562

EXTRACTION CONTROL APPARATUS

Ozro N. Bryant, Prospect Park, Pa., assignor to Westinghouse Electric & Manufacturing Company, East Pittsburgh, Pa., a corporation of Pennsylvania Application October 25, 1940, Serial No. 362,824

13 Claims. (Cl. 60—67)

The invention relates to steam turbines having one or more points at which steam may be extracted or inducted and it has for an object to provide improved means for controlling the valves for admitting steam to the turbine sections, including the section or sections at the down-stream side or sides of said point or points, so that the turbine will carry a given load with the pressure at each point held within close limits of variation.

A more particular object of the invention is to provide a turbine having a multiplicity of extraction or induction points and admission and extraction or induction point valves operated by servo-motors controlled by relays with each moved in response to the resultant of several pressures including the governing pressure and a pressure dependent upon extraction or induction line steam pressure.

A further object of the invention is to provide a hydraulic control system for the servo-motors of the admission and extraction or induction point valves of a double extraction or induction point turbine, wherein governing pressure exerts a controlling effect on all of the servo-motors and wherein first and second pressure regulators are associated with the first and second extraction or induction lines, the first regulator providing first and second controlling fluid pressures varying in inverse relation with the first fluid pressure acting on the admission valve servo-motor relay in opposition to governing pressure and the second fluid pressure acting on the servo-motor relays of the first and second extraction or induction point valves and the second regulator providing third and fourth controlling fluid pressures varying in inverse relation with the third fluid pressure acting on the servo-motor relays of the admission valve and of the first reaction valve and the fourth fluid pressure acting on the servo-motor relay of the second extraction valve.

These and other objects are effected by the invention as will be apparent from the following description and claims taken in connection with the accompanying drawing, forming a part of this application, in which:

Figures 1, 2, 3:
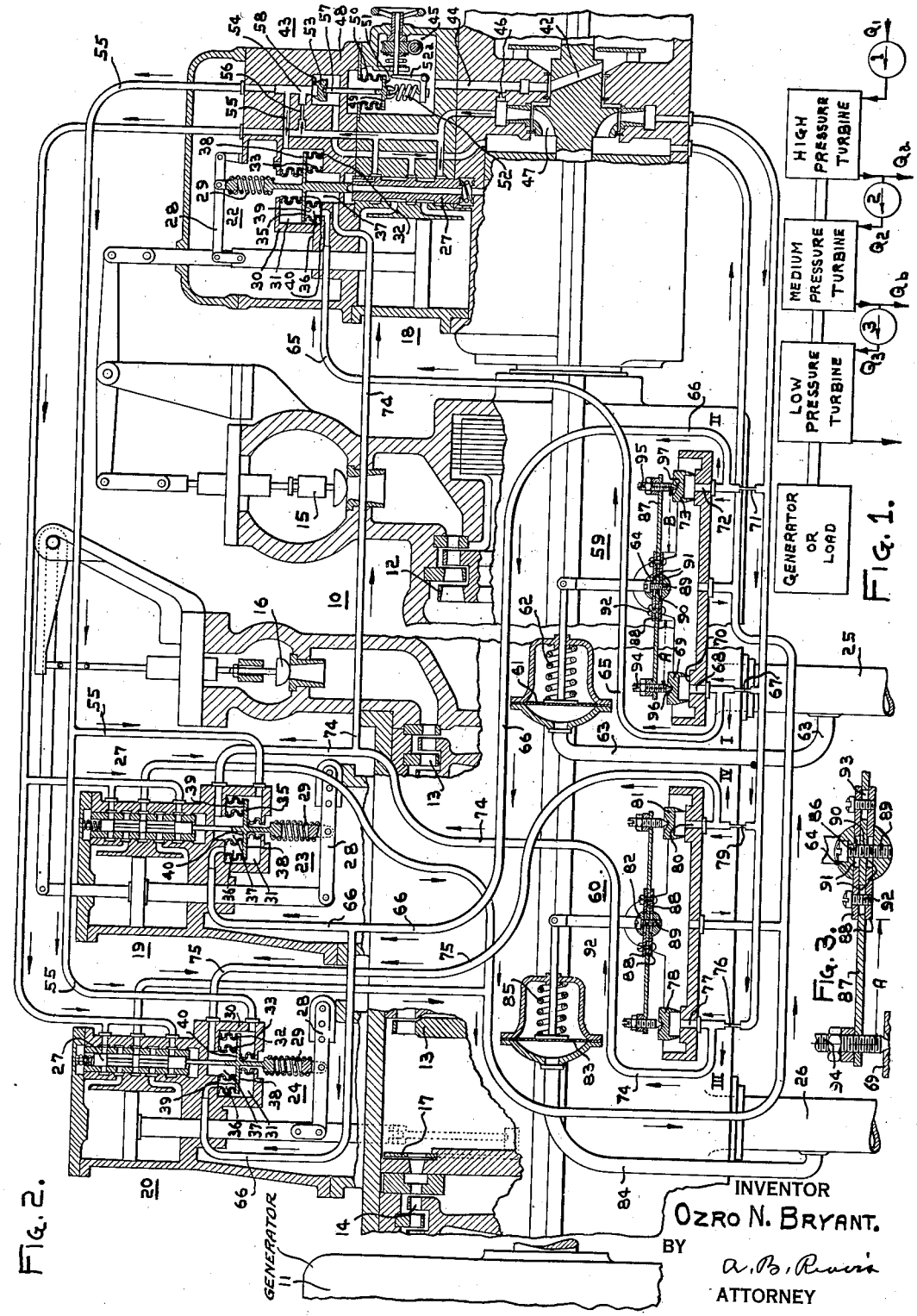
Fig. 1 is a diagrammatic view of underlying principles involved.
Fig. 2 is a longitudinal sectional view of a multiple extraction turbine showing the improved control system applied thereto.
Fig. 3 is an enlarged detail of one of the pressure regulators.

Referring to Fig. 1, the high, intermediate and low-pressure sections of the turbine are shown separated in order to make clearer the underlying principles of the control system. The turbine sections are indicated as H. P., I. P., and L. P.; the governors and valves for the sections are designated 1, 2, and 3; and the rates of steam flow as $Q_1$, $Q_2$, and $Q_3$ for the H. P., I. P., and L. P. sections, respectively, and $Q_a$ and $Q_b$ for the first and second extraction lines.

If the incremental steam rates of the H. P., I. P. and L. P. turbine sections are designated $W_1$, $W_2$ and $W_3$ and the power developed as $P_1$, $P_2$ and $P_3$, the following relations hold:

Total power, (1) $$P_t = P_1 + P_2 + P_3$$

or (2) $$P_t = \frac{Q_1}{W_1} + \frac{Q_2}{W_2} + \frac{Q_3}{W_3}$$

Assuming $Q_1$, $Q_2$ and $Q_3$ to be flows in excess of the no load flow for each section.

If no flow exists at either extraction point, $Q_a$ and $Q_b = 0$ (3) Then $Q_1 = Q_2 = Q_3$ and any change in total power requires an equal change in flow through each governing valve, which may be expressed as (4) $$\Delta P_t = \frac{\Delta Q_1}{W_1} + \frac{\Delta Q_2}{W_2} + \frac{\Delta Q_3}{W_3}$$

and (5) $$\Delta Q_1 = \Delta Q_2 = \Delta Q_3$$

since the flow is continuous through the entire turbine.

If constant flows $Q_a$ and $Q_b$ must be maintained, when there is a load change $\Delta P_t$ it is still true that $$\Delta P_t = \frac{\Delta Q_1}{W_1} + \frac{\Delta Q_2}{W_2} + \frac{\Delta Q_3}{W_3}$$

and that $$\Delta Q_1 = \Delta Q_2 = \Delta Q_3$$

This means that the governors 1, 2 and 3 must change the steam flows $Q_1$, $Q_2$ and $Q_3$ an equal amount for a given change in speed, or in speed changer setting, or for a given change in electrical load, where the turbine has an electrical load control device.

Since $$\Delta P_t = \frac{\Delta Q_1}{W_1} + \frac{\Delta Q_2}{W_2} + \frac{\Delta Q_3}{W_3}$$

it is clear that to maintain a given load $P_t$ when there is a change in extraction flow $Q_a$ or $Q_b$ the load change (6) $$\Delta P_t = 0 = \frac{\Delta Q_1}{W_1} + \frac{\Delta Q_2}{W_2} + \frac{\Delta Q_3}{W_3}$$

Hence any change in one of the terms requires an adjustment in one or both of the other terms in an opposite direction to maintain equilibrium conditions.

Since (7) $\quad Q_a = Q_1 - Q_2$ and $Q_b = Q_2 - Q_3$ (8) $\quad \Delta Q_a = \Delta Q_1 - \Delta Q_2$ and $\Delta Q_b = \Delta Q_2 - \Delta Q_3$ If (9) $\quad \Delta Q_a = 0$, then $\Delta Q_1 = \Delta Q_2$ and if

(10) $\quad \Delta Q_b = 0$, then $\Delta Q_2 = \Delta Q_3$

From 6 to 10, inclusive, when steam is extracted at the first extraction point, the flow through 1 is increased while flows through 2 and 3 are decreased equally but in proportion to the increase through 1.

If $Q_a$ increases while $\Delta Q_b = 0$ and $\Delta P_t = 0$

(11) $\quad \Delta Q_a = \Delta Q_1 - \Delta Q_2$ and $\Delta Q_2 = \Delta Q_3$

(12) $$\Delta Q_1 = -W_1 \left( \frac{\Delta Q_2}{W_2} + \frac{\Delta Q_3}{W_3} \right)$$

(13) $$\frac{\Delta Q_1}{-\Delta Q_2 \text{ or } -\Delta Q_3} = \frac{W_1}{W_2} + \frac{W_1}{W_3}$$

If $Q_b$ increases, while $\Delta Q_a = 0$ and $\Delta P_t = 0$

(14) $\quad \Delta Q_b = \Delta Q_2 - \Delta Q_3$ and $\Delta Q_1 = \Delta Q_2$ and from (6)

$$\frac{\Delta Q_1}{W_1} + \frac{\Delta Q_2}{W_2} + \frac{\Delta Q_3}{W_3} = 0 \text{ when } \Delta P_t = 0$$

Hence

(15) $$\frac{\Delta Q_1 \text{ or } \Delta Q_2}{W_1} + \frac{\Delta Q_1 \text{ or } \Delta Q_2}{W_2} = -\frac{\Delta Q_3}{W_3}$$

and

(16) $$\frac{-\Delta Q_3}{\Delta Q_1 \text{ or } \Delta Q_2} = \frac{W_3}{W_1} + \frac{W_3}{W_2}$$

The foregoing leads to the following requirements:

1. All three governors are affected equally in the same direction by the speed-responsive or load-responsive control means.
2. A decrease in pressure at the high-pressure extraction point causes governor 1 to admit more steam and causes governors 2 and 3 to decrease the steam flow through the valves in equal amounts which are dependent upon constants of the turbine, that is, the incremental steam rates of the three sections.
3. A decrease in pressure at the lower pressure extraction point causes the governors 1 and 2 to increase the steam flow through the valves by equal increments and causes 3 to decrease the steam flow through the valve by an amount which is dependent upon the incremental steam rates of the three sections.
4. A suitable control device should be fully adjustable as to pressure range and as to ratio of its effect upon the various governors of the turbine.

While Fig. 1 shows a turbine arrangement of the extraction type and so describes it, it will be obvious that the points indicated as extraction points might be either extraction or induction points. In an extraction turbine, the regulator cooperates with the governor to keep the extraction pressure within narrow limits of variation while providing for such flow conditions in the turbine as to satisfy the extraction and power demand. On the other hand, if instead of a point being an extraction one, it is an induction one, the regulator is still responsive to line pressure to keep the latter within narrow limits of variation while cooperating with the governor to control the flow of steam through the turbine to obtain the required power. Thus, in both cases, the regulator cooperates with the governor to keep the pressure in the extraction or induction line within narrow limits of variation while providing for such flow conditions in the turbine to develop the required power.

Heretofore, steam turbines having a multiplicity of extraction or induction points have had complicated arrangements of mechanical linkages, relays, and servo-motors or a multiplicity of hydraulic pressure combiners, relief valves and complicated piping. In comparison, the present hydraulic control system embodying the foregoing principles provides one which is not only relatively simple but one easily adapted to turbines of this type.

Referring now to the apparatus more in detail, in Fig. 2, there is shown a turbine, at 10, connected to a load, for example, to the generator, at 11, the turbine including a high-pressure section 12, an intermediate-pressure section 13 and a low-pressure section 14. An admission valve 15 controls the flow of steam through the high-pressure section 12 and valves 16 and 17 control the flow of steam through the intermediate and low-pressure sections 13 and 14, respectively. The servo-motors at 18, 19 and 20 operate the valves 15, 16 and 17, respectively, and they are provided with pressure-responsive relays, at 22, 23 and 24, respectively.

First and second extraction or induction lines 25 and 26 communicate with the turbine between the sections 12 and 13 and between the sections 13 and 14, respectively.

The three servo-motors and their controlling relays are similar so that a more extended description of one will suffice. Referring to the servo-motor, at 18, and its relay, at 22, the servo-motor includes a pilot valve 27 operatively connected to the relay, at 22, the connection preferably including a follow-up lever 28 and a spring 29 serving purposes to be described. The relay includes a housing 30 providing an internal chamber 31 with outer and inner bellows elements 32 and 33 therein and attached to the movable abutment 35, the bellows elements defining therebetween the pressure chamber 36 and the inner bellows element bounding the pressure chamber 37.

The movable abutment 35 presents, to the chamber 31, a pressure area 38, and, to the chambers 36 and 37, the opposing pressure areas 39 and 40. The spring 29 exerts its force on the abutment in opposition to pressure applied to the pressure area 38.

Referring to the governor providing transformed fluid pressure acting on all of the pressure areas 38 of the servo-motor relays, fluid under primary pressure furnished by the impeller 42 acts on the pressure transformer, at 43, to secure amplification in predetermined ratio of changes in transformed or secondary pressure in relation to changes in primary or impeller pressure.

The impeller 42 preferably provides centrifugal resistance opposing escape of fluid from the space including the passage 44 and the transformer chamber 45, fluid being supplied to the space by an orifice 46 from a suitable pressure source such as an impeller 47.

The pressure transformer, at 43, includes a housing 48 having the chamber 45 with the movable pressure abutment 49 therein, the pressure abutment being connected to one end of the chamber by means of the bellows element 50. The abutment presents a pressure area 51 to the interior of the chamber 45, a spring 52 exerts force on the abutment in opposition to the fluid pressure force exerted on the pressure area thereof, and a speed changer 52a is operatively connected to the spring.

A cup valve or member 53 is arranged in covering relation with respect to the escape port 54 of a space, including the passages 55 and the chambers 31 of the relays, the space being supplied, by means of the orifice 56, with fluid from any suitable high-pressure source. The cup or covering member is carried by a stem 57 whose lower end engages the abutment 49. With this arrangement, the pressure maintained in the space including the passages 55 and the chambers 31 depends upon the escape or annular orifice area providing between the cup valve 53 and the seat 58 bounding the port 54, the greater the escape area, the lower the pressure and vice versa.

With change in impeller or primary pressure due to speed change, the transformed fluid pressure applied to the space including the passages 55 and the chambers 31 also changes, the transformed pressure changing until the force thereof acting on the cup valve again balances the force of primary pressure applied thereto.

The extraction or induction lines 25 and 26 have associated therewith the pressure regulators, at 59 and 60, respectively. The pressure regulator, at 59, includes a diaphragm 61 movable against the force of a spring 62 by steam supplied under pressure by the line 63 connected to the first extraction line 25, the diaphragm being operatively connected to the fulcrum shaft 64 to vary first and second controlling fluid pressures in the lines 65 and 66 in inverse relation, the line 65 being connected to the fluid pressure space 36 of the relay, at 22, and the line 66 being connected to the fluid pressure spaces 36 of the relays, at 23 and 24, to provide for application of the pressures to the pressure areas 39.

The line 65 and the fluid pressure space 36 of the relay, at 22, provide a space supplied with fluid by means of an orifice 67 from any suitable source under pressure, the space having a discharge port 68 covered by the member or cup 69 so as to define, with respect to the seat 70 bounding the port 68, an annular escape orifice, the first pressure in said space depending upon the escape flow area of such annular orifice.

In like manner, the line 66 together with the spaces 36 of the relays, at 23 and 24, provides a pressure space having an orifice 71 for supplying fluid thereto from any suitable source and having an annular escape orifice defined by the escape port 72 and the cup valve or member 73 in covering relation with respect thereto.

If there is an increase in pressure in the first line 25, the regulator, at 59, responds thereto, the fulcrum shaft 65 being rotated in a clockwise direction to decrease the first fluid pressure in the line 65 and the space 36 of the relay, at 22, resulting in movement of the valve 15 in a closing direction and to increase the pressure in the line 66 and the fluid pressure spaces 36 of the relays, at 23 and 24, to move the valves 16 and 17 in an opening direction. On the other hand, if the first line steam pressure should decrease, then the contrary operation occurs, the valve 15 moving in an opening direction and the valves 16 and 17 moving in a closing direction. Thus, a change in first line pressure results in modification of flow through the turbine in order to maintain the line pressure substantially constant, any change in power of the high-pressure section 12 being compensated for by an opposite and equal change in power of the turbine sections 13 and 14.

The regulator, at 60, is similar to that already described, it providing inversely related third and fourth pressures in the lines 74 and 75 for application to the relay pressure areas 40, the line 74 and the fluid pressure spaces 37 of the relays, at 22 and 23, providing a space for the third fluid pressure, such space being supplied by means of an orifice 76 from a suitable pressure source and escaping through the port 77 and the annular escape orifice defined with respect to the latter by means of the member or cup valve 78. Similarly, the passage 75 and the fluid pressure space 37 of the relay, at 24, provide an enclosed space having an orifice 79 for supplying fluid thereto from any suitable source and having an annular escape orifice defined by the port 80 and the cup valve or member 81. The cup valves or members 78 and 81 are operatively connected to the fulcrum shaft 82 connected to the diaphragm 83, the latter being acted upon by steam under pressure supplied by the line 84 from the second line 26 and being opposed by the spring 85.

If the pressure in the second extraction or induction line 26 should increase, then the fulcrum shaft 82 would move in a clockwise direction, thereby reducing the fluid pressure in the third fluid pressure space to bring about movement of the valves 15 and 16 in a closing direction and to increase the fourth fluid pressure to bring about movement of the valve 17 in an opening direction. Should the second line pressure tend to decrease, the contrary operation would occur, the valves 15 and 16 moving in an opening direction and the valve 17 moving in a closing direction.

While any suitable means may be employed for utilizing movement of the fulcrum shafts 64 and 82 to secure application of pressure or force to the covering members or cup valves, I prefer to use a cantilever spring arrangement for this purpose.

The fulcrum shaft 64 has a transverse opening 86 through which extend the leaf spring 87 with clamp plates 88 at either side thereof. A screw 89 carried by the fulcrum shaft extends through a closely fitting opening 90 of the leaf or cantilever spring 87 to hold the latter against longitudinal movement relatively to the fulcrum shaft. The clamp plates have longitudinal slots 91 for the screw 89 and have screws 92 for fastening them in clamping relation to the spring 87, the latter screws extending through slots 93 provided in the leaf spring. With the screws 92 loosened, the clamp plates may be slid longitudinally to vary the effective lengths of the cantilever spring arms indicated at A and B, one arm being increased to the same extent as the other arm is decreased.

The outer ends of the spring 87 are connected to screws 94 and 95 having point bearing relation 96 and 97 with respect to the cups or covering members 69 and 73.

It will be apparent that the leaf spring 87 carried by the fulcrum shaft 64 together with the adjustable clamp device provide for variation of control pressures in opposite direction at variable ratios of rate of change. The scale of the cantilever spring varies inversely as the cube of its length. Hence, a relatively small motion of the clamping plates will give a large change in ratio of spring scales.

The regulator, at 60, also embodies a leaf spring 87 arranged in the same way as that already described.

The apparatus described operates as follows: If there is a change in speed, then the transformed pressure provided by the governor and supplied to the relays, at 22, 23 and 24, changes and all of the valves 15, 16 and 17 move in like direction so that the same flow through the turbine sections 12, 13 and 14 suitable to the load may be secured. If there is a change in pressure in the first line 25, then the pressure regulator, at 59, responds, the first and second controlling fluid pressures, indicated at "I" and "II", being varied inversely with the first fluid pressure varying inversely with respect to the extraction or induction steam pressure. If there is a change in pressure of the second extraction or induction line 26, then the third and fourth controlling fluid pressures, indicated at "III" and "IV," in the lines 74 and 75 will vary inversely with the third fluid pressure being varied inversely with respect to the extraction or induction steam pressure, whereby, with a decrease in extraction or induction pressure, the third fluid pressure is increased to move the valves 15 and 16 in an opening direction and the fourth fluid pressure in the passage 75 is decreased to cause movement of the valve 17 in a closing direction, and, with an increase in extraction or induction steam pressure, the contrary operation takes place, the third fluid pressure decreasing to bring about movement of the valves 15 and 16 in a closing direction and the fourth fluid pressure in the line 75 increasing to bring about movement of the valves 17 in an opening direction. The quantitative relations of pressures to obtain flow conditions in the turbine sections suitable to the steam rates thereof are made possible by means of the adjustable cantilever spring arms.

While the invention has been particularly described for a turbine having two extraction or induction lines, it will be apparent that it is applicable to any number of such lines, it merely being necessary to arrange each relay so as to have a pressure area at its upper side for each extraction line. For example, if the control system is applied to a turbine having a single extraction or induction line, then it would merely be necessary to have one regulator providing inversely-related controlling fluid pressures applied to the upper pressure areas of the admission and extraction valve servo-motor relays, the pressure which decreases with increases in extraction or induction pressure being applied to the admission valve servo-motor relay and the other pressure being applied to the extraction valve servo-motor relay.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. The combination with a turbine having high, intermediate and low pressure sections, valves for controlling the admission of steam to the sections and a servo-motor for each valve, and steam conduits connected to flow path spaces of the turbine immediately ahead of the valves for the intermediate and low pressure sections: of a relay for each servo-motor; the relays comprising a movable abutment having opposed pressure areas with first areas facing in such directions that pressures applied thereto tend to move the valves in like directions with respect to opening and closing and springs exerting forces on the abutments in directions opposite to those of fluid pressures applied to the first areas; a pressure regulator for each steam conduit and responsive to its steam pressure to provide a pair of inversely-related controlling fluid pressures; means providing a governing fluid pressure varying as a function of the speed of the turbine and for applying such pressure to said first pressure areas of the relays to operate the latter to adjust the valves for steam flow through the turbine in accordance with the power demand; and means providing for the application of said regulator controlling fluid pressures to the relay pressure areas other than said first areas to operate the relays to adjust the valves.

2. The combination with a turbine having a plurality of power-developing sections, initial and intermediate valves for controlling the admission of steam to the sections and a servo-motor for each valve, and a steam conduit connected to the flow path space of the turbine immediately ahead of the intermediate valve: of a relay for each servo-motor; each relay comprising a movable abutment having opposed pressure areas and the first areas of the abutments facing in such a direction that pressure applied thereto tends to move the valves in like directions with respect to opening and closing and springs exerting forces on the abutments in directions opposite to those of fluid pressures applied to the first areas; a pressure regulator including means providing a pair of enclosed spaces, means providing controlling fluid pressures in said spaces and including a relief valve for each space, a rock shaft, springs carried by the rock shaft for loading the relief valves to control the fluid pressures in said spaces, and means responsive to conduit steam pressure for moving the rock shaft to provide inverse change in the controlling fluid pressures; means providing a governing fluid pressure varying as a function of the speed of the turbine and for applying such pressure to the first pressure areas of the relays to operate the latter to adjust said valves for steam flow through the turbine in accordance with the power demand; and means providing for the application of said pressure regulator controlling fluid pressures to the pressure areas other than the first pressure areas of said abutments.

3. The combination with a turbine having a plurality of power-developing sections, initial and intermediate valves for controlling the admission of steam to the sections and a servo-motor for each valve, and a steam conduit connected to the flow path space of the turbine immediately ahead of the intermediate valve: of a relay for each servo-motor; each relay comprising a movable abutment having opposed pressure areas with a first area facing in such a direction that pressure applied thereto tends to move the valves in like directions with respect to opening and closing and springs exerting forces on the abutments in a direction opposite to those of fluid pressures applied to the first areas; a pressure regulator for the steam conduit and including means providing a pair of enclosed spaces, means providing controlling fluid pressures in said spaces and including a relief valve for each space, a rock shaft, a pair of springs carried by and extending in opposite directions from the rock shaft for loading the relief valves to control the fluid pressures in said spaces, and means responsive to conduit steam pressure for moving the rock shaft to provide inverse change in the controlling fluid pressures; means for varying the effective lengths of the springs in inverse relation; means providing a governing fluid pressure varying as a function of the speed of the turbine and for applying such pressure to the first pressure areas of the relays to operate the latter to adjust said valves for steam flow through the turbine in accordance with the power demand; and means providing for the application of said pressure regulator controlling fluid pressures to the pressure areas other than the first pressure areas of said abutment to operate the relays to adjust the valves for steam flow through the turbine.

4. The combination with a turbine having a plurality of power-developing sections, initial and intermediate valves for controlling the admission of steam to the sections and a servo-motor for each valve, and a steam conduit connected to the flow path space of the turbine immediately ahead of the intermediate valve: of a relay for each servo-motor; each relay comprising a movable abutment presenting first and second opposed pressure areas and a spring exerting its force on the abutment in opposition to that of fluid pressure exerted on the first pressure area; means providing a governing fluid pressure varying as a function of the speed of the turbine and for applying such pressure to the first pressure areas of the relays; a pressure regulator responsive to the conduit steam pressure to provide first and second inversely related fluid pressures with the first pressure decreasing with increase in steam pressure and vice versa; means for applying the first pressure to the second pressure area of the relay for admission valve servo-motor; and means for applying the second pressure to the second pressure area of the relay for the extraction valve servo-motor.

5. The combination with a turbine having a plurality of power-developing sections, initial and intermediate valves for controlling the admission of steam to the sections and a servo-motor for each valve, and a steam conduit connected to the flow path space of the turbine immediately ahead of the intermediate valve: of a relay for each servo-motor; each relay comprising a movable abutment presenting first and second opposed pressure areas and a spring exerting its force on the abutment in opposition to that of fluid pressure exerted on the first pressure area; a governor providing a governing fluid pressure varying as a function of the speed of the turbine; means for applying the governing fluid pressure to the first pressure areas of all of the relays; means providing a first enclosed space to which said second pressure area of the admission valve servo-motor relay is exposed; means for maintaining first fluid pressure in said first space including an orifice for supplying fluid thereto from a suitable source and an adjustable orifice providing for escape of fluid therefrom; means providing a second enclosed space to which said second pressure area of the extraction valve servo-motor relay is exposed; means for maintaining second fluid pressure in said second space including an orifice for supplying fluid thereto from a suitable source and an adjustable orifice providing for escape therefrom; and a regulator responsive to the conduit steam pressure to adjust said escape orifices in inverse relation such that, with an increase in conduit steam pressure, the area of the escape orifice for the first space is increased and that for the second space is decreased and vice versa.

6. The combination with a turbine having high, intermediate and low pressure sections, valves for controlling the admission of steam to the sections and a servo-motor for each valve, and steam conduits connected to flow path spaces of the turbine immediately ahead of the valves for the intermediate and low pressure sections: of a relay for each servo-motor; each relay comprising an abutment having opposed pressure areas at first and second sides thereof with the area at the first side directed so that pressure applied thereto tends to operate the associated servo-motor to move the associated valve in a closing direction and a spring exerting its force on the abutment in a direction opposite to that of fluid pressure exerted on said first side pressure area; means operated by the turbine to provide a force dependent upon turbine speed; means for transforming changes in said force into changes in fluid pressure; a pressure regulator for each steam conduit and responsive to steam pressure therein to provide inversely related controlling fluid pressures; means providing for application of said transformed pressure to all of said relay first side pressure areas to operate the relays to adjust the valves to vary the steam flow through the turbine in accordance with the power demand; and means providing for application of said controlling fluid pressures to the relay second side pressure areas so that the relays are operated to adjust the valves for steam flow through the turbine.

7. The combination with a turbine having high, intermediate and low pressure sections, valves for controlling the admission of steam to the sections and a servo-motor for each valve, and steam conduits connected to flow path spaces of the turbine immediately ahead of the valves for the intermediate and low pressure sections: of a relay for each servo-motor; each relay comprising an abutment having opposed pressure areas at first and second sides thereof with the area at the first side directed so that pressure applied thereto tends to operate the associated servo-motor to move the associated valve in a closing direction and a spring exerting its force on the abutment in a direction opposite to that of fluid pressure exerted on said first side pressure area; means operated by the turbine and including a spring to provide a force dependent upon turbine speed; means for transforming changes in said force into changes in fluid pressure; a pressure regulator for each steam conduit and responsive to steam pressure therein to provide inversely related controlling fluid pressures; means providing for application of said transformed pressure to all of said relay first side pressure areas to operate the relays to adjust the valves to vary the steam flow through the turbine in accordance with the power demand; means providing for application of said controlling fluid pressures to the relay second side pressure areas so that the relays are operated to adjust the valves for steam flow through the turbine for developing a given power, and means providing for adjustment of said last-named spring.

8. The combination with a turbine including high, intermediate, and low pressure sections; first and second steam lines between the high and the intermediate pressure sections and between the intermediate and the low pressure sections, respectively; first, second, and third valves controlling the admission of steam to the sections; and first, second, and third servo-motors for operating the valves: of first, second, and third relays for the first, second, and third servo-motors, respectively; each relay including an abutment movable to cause its servo-motor to move the associated valve in opening and closing directions; means for moving each abutment including a first pressure area for application of fluid pressure, second and third pressure areas for application of fluid pressures and opposed to the first area, and a spring; means providing a first enclosed space to which all of said first pressure areas are exposed; means providing a second enclosed space to which the second pressure area of the first relay is exposed; means providing a third enclosed space to which the second pressure areas of the second and third relays are exposed; means providing a fourth enclosed space to which the third pressure area of the third relay is exposed; means providing a fifth enclosed space to which the third pressure areas of the first and second relays are exposed; means providing for the maintenance in said first space of fluid under pressure dependent upon turbine speed; means responsive to first steam line pressure for providing fluid pressures in said second and third spaces such that with an increase in steam line pressure the pressure in said second space decreases and that in said third space increases and vice versa; and means responsive to second steam line pressure for providing fluid pressures in said fourth and fifth spaces such that with an increase in steam line pressure the pressure in said fourth space decreases and that in said fifth space increases and vice versa.

9. The combination with a turbine including high, intermediate, and low pressure sections; first and second steam lines between the high and the intermediate pressure sections and between the intermediate and the low pressure sections, respectively; first, second, and third valves controlling the admission of steam to the sections; and first, second, and third servo-motors for operating the valves: of first, second, and third relays for the first, second, and third servo-motors, respectively; each relay including an abutment movable to cause its servo-motor to move the associated valve in opening and closing directions; means for moving each abutment including a first pressure area for application of fluid pressure, second and third pressure areas for application of fluid pressures and opposed to the first area, and a spring; means providing a governing force which is a function of turbine speed; means for transforming said governing force into fluid pressure; means providing for said transformed fluid pressure a first enclosed space to which all of the first pressure areas of the relays are exposed; means providing a second enclosed space to which the second pressure area of the first relay is exposed; means providing a third enclosed space to which the second pressure areas of the second and third relays are exposed; means providing a fourth enclosed space to which the third pressure area of the third relay is exposed; means providing a fifth enclosed space to which the third pressure areas of the first and second relays are exposed; means including first, second, third and fourth variable orifices for maintaining fluid pressures in said second, third, fourth and fifth spaces, respectively; means responsive to first steam line pressure for increasing the area of the first orifice and decreasing that of the second orifice and vice versa; and means responsive to increase in second steam line steam pressure to increase the area of the third orifice and decrease that of the fourth orifice and vice versa.

10. The combination with a turbine including high, intermediate, and low pressure sections; first and second steam lines between the high and the intermediate pressure sections and between the intermediate and the low pressure sections, respectively; first, second, and third valves controlling the admission of steam to the sections; and first, second, and third servo-motors for operating the valves: of first, second, and third relays for the first, second, and third servo-motors, respectively; each relay including an abutment movable to cause its servo-motor to move the associated valve in opening and closing directions; means for moving each abutment including a first pressure area for application of fluid pressure, second and third pressure areas for application of fluid pressures and opposed to the first area, and a spring; means providing a governing force which is a function of turbine speed; means for transforming said governing force into fluid pressure; means providing for said transformed fluid pressure a first enclosed space to which all of the first pressure areas of the relays are exposed; means providing a second enclosed space to which the second pressure area of the first relay is exposed; means providing a third enclosed space to which the second pressure areas of the second and third relays are exposed; means providing a fourth enclosed space to which the third pressure area of the third relay is exposed; means providing a fifth enclosed space to which the third pressure areas of the first and second relays are exposed; means including first, second, third and fourth variable orifices for maintaining fluid pressures in said second, third, fourth and fifth spaces, respectively; each variable orifice including an escape port for its space and a member cooperating with the port and bounding an area subject to space pressure; a first pressure regulator including a rock shaft movable in response to change in first extraction line steam pressure; springs for exerting force on the members of the first and second orifices in opposition to the force of fluid pressures exerted on the pressure areas thereof; means utilizing movement of said rock shaft to change the forces of said springs such that with an increase in steam line pressure the spring force for the member of the first orifice is decreased and that for the member of the second orifice is increased and vice versa; a second pressure regulator including a rock shaft movable in response to change in second steam line pressure; springs for exerting forces on said members of the third and fourth orifices in opposition to the forces of the fluid pressure exerted on the pressure areas thereof; and means utilizing movement of the last-named rock shaft to vary the force of the last-named springs such that with an increase in second steam line pressure the spring force for the member of the third orifice is decreased and that for the member of the fourth orifice is increased and vice versa.

11. The combination with a turbine including high, intermediate, and low pressure sections; first and second steam lines between the high and the intermediate pressure sections and between the intermediate and the low pressure sections, respectively; first, second, and third valves controlling the admission of steam to the sections; and first, second, and third servo-motors for operating the valves: of first, second, and third relays for the first, second, and third servo-motors, respectively; each relay including an abutment movable to cause its servo-motor to move the associated valve in opening and closing directions; means for moving each abutment including a first pressure area for application of fluid pressure, second and third pressure areas for application of fluid pressures and opposed to the first area, and a spring; means providing a governing force which is a function of turbine speed; means for transforming said governing force into fluid pressure; means providing for said transformed fluid pressure a first enclosed space to which all of the first pressure areas of the relays are exposed; means providing a second enclosed space to which the second pressure area of the first relay is exposed; means providing a third enclosed space to which the second pressure areas of the second and third relays are exposed; means providing a fourth enclosed space to which the third pressure area of the third relay is exposed; means providing a fifth enclosed space to which the third pressure areas of the first and second relays are exposed; means including first, second, and fourth variable orifices for maintaining fluid pressures in said second, third, fourth and fifth spaces, respectively; each variable orifice including an escape port for its space and a member cooperating with the port and bounding an area subject to space pressure; a first rock shaft; cantilever springs carried by said rock shaft for exerting forces on the members of the first and second orifices in opposition to fluid pressure forces exerted on the pressure areas thereof; means responsive to increase in pressure of the first steam line to move the rock shaft to decrease the spring force for the first orifice member and to increase that for the second orifice member and vice versa; a second rock shaft; cantilever springs carried by the last-named rock shaft for exerting forces on the members of the third and fourth orifices in opposition to fluid pressure forces exerted on the pressure areas thereof; and means responsive to increase in pressure in the second steam line for decreasing the force of the spring for the third orifice member and increasing the force of the spring for the fourth orifice member and vice versa.

12. The combination with a turbine including high, intermediate, and low pressure sections; first and second steam lines between the high and the intermediate pressure sections and between the intermediate and the low pressure sections, respectively; first, second, and third valves controlling the admission of steam to the sections; and first, second, and third servo-motors for operating the valves: of first, second, and third relays for the first, second, and third servo-motors, respectively; each relay including an abutment movable to cause its servo-motor to move the associated valve in opening and closing directions; means for moving each abutment including a first pressure area for application of fluid pressure, second and third pressure areas for application of fluid pressures and opposed to the first area, and a spring; means providing a governing force which is a function of turbine speed; means for transforming said governing force into fluid pressure; means providing for said transformed fluid pressure a first enclosed space to which all of the first pressure areas of the relays are exposed; means providing a second enclosed space to which the second pressure area of the first relay is exposed; means providing a third enclosed space to which the second pressure areas of the second and third relays are exposed; means providing a fourth enclosed space to which the third pressure area of the third relay is exposed; means providing a fifth enclosed space to which the third pressure areas of the first and second relays are exposed; means including first, second, and fourth variable orifices for maintaining fluid pressures in said second, third, fourth and fifth spaces, respectively; each variable orifice including an escape port for its space and a member cooperating with the port and bounding an area subject to space pressure; a first rock shaft; cantilever leaf springs carried by the rock shaft for exerting spring forces on the members of the first and second orifices in opposition to fluid pressure forces exerted on the pressure areas thereof; means for reciprocally varying the effective lengths of said cantilever springs; means responsive to increase in first steam line pressure to decrease the spring force exerted on the member of the first orifice and to increase that exerted on the member of the second orifice and vice versa; a second rock shaft; cantilever leaf springs carried by the second rock shaft for exerting spring forces on the members of the third and fourth orifices in opposition to the fluid pressure forces exerted on the pressure areas of such members; means for reciprocally varying the effective lengths of the last-named cantilever springs; means responsive to second steam line pressure to decrease the spring force of the member of the third orifice and to increase that of the member of the fourth orifice and vice versa.

13. The combination with a turbine including high, intermediate, and low pressure sections; first and second steam lines between the high and the intermediate pressure sections and between the intermediate and the low pressure sections, respectively; first, second, and third valves controlling the admission of steam to the sections; and first, second, and third servo-motors for operating the valves: of first, second, and third relays for the first, second, and third servo-motors, respectively; each relay including an abutment movable to cause its servo-motor to move the associated valve in opening and closing directions; means for moving each abutment including a first pressure area for application of fluid pressure, second and third pressure areas for application of fluid pressures and opposed to the first area, and a spring; means providing a first enclosed space to which all of said first pressure areas are exposed; means providing a second enclosed space to which the second pressure area of the first relay is exposed; means providing a third enclosed space to which the second pressure areas of the second and third relays are exposed; means providing a fourth enclosed space to which the third pressure area of the third relay is exposed; means providing a fifth enclosed space to which the third pressure areas of the first and second relays are exposed; means providing for the maintenance of fluid pressures in said spaces including orifices for supplying fluid thereto from a suitable pressure source and including first, second, third, fourth, and fifth variable orifices for the first, second, third, fourth and fifth spaces, respectively; means for exerting a controlling effect on the first variable orifice so that the pressure in said first space depends upon turbine speed; a first pressure regulator responsive to increase in first steam line pressure to increase the escape area of the second orifice and to decrease the escape area of the third orifice and vice versa; and a second pressure regulator responsive to second steam line pressure to increase the escape area of the fourth orifice and to decrease that of the fifth orifice and vice versa.

OZRO N. BRYANT.